United States Patent
Yoon et al.

(10) Patent No.: US 10,848,530 B2
(45) Date of Patent: Nov. 24, 2020

(54) CONFERENCE SYSTEM AND METHOD FOR INTERWORKING BETWEEN AUDIO CONFERENCE AND WEB CONFERENCE

(71) Applicant: SAMSUNG SDS CO., LTD., Seoul (KR)

(72) Inventors: Hee-Tae Yoon, Seoul (KR); Do-Hyung Im, Seoul (KR); Jun-Ho Kang, Seoul (KR); Seong-Joong Chang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/119,432

(22) Filed: Aug. 31, 2018

(65) Prior Publication Data

US 2019/0075142 A1    Mar. 7, 2019

(30) Foreign Application Priority Data

Sep. 1, 2017    (KR) .......................... 10-2017-0111791

(51) Int. Cl.
*G06F 13/00*    (2006.01)
*H04L 29/06*    (2006.01)

(52) U.S. Cl.
CPC ........ *H04L 65/403* (2013.01); *H04L 65/1069* (2013.01)

(58) Field of Classification Search
CPC .......... G06F 13/00; H04Q 3/00; G06Q 10/10; H04L 12/581; H04L 12/1822; H04L 29/06; H04L 29/06027; H04L 29/08072; H04L 65/403; H04L 65/1069; H04L 65/1083; H04L 65/4053; H04M 3/56; H04M 3/465; H04M 3/487; H04M 3/563; H04M 7/00; H04M 7/0003; H04M 7/0039; H04M 7/0057; H04M 7/1275; H04M 2201/40; H04M 2203/254; H04M 2203/5009; H04M 2203/5027; H04M 2203/5063; H04M 2250/22; H04M 2250/62; H04M 7/03; H04M 7/039

USPC ...................................... 379/204.01; 709/204

See application file for complete search history.

(56) References Cited

U.S. PATENT DOCUMENTS

| | | | | |
|---|---|---|---|---|
| 2007/0116223 | A1* | 5/2007 | Burke | H04M 7/006 379/201.12 |
| 2007/0116224 | A1* | 5/2007 | Burke | H04L 29/06027 379/201.12 |
| 2009/0164876 | A1* | 6/2009 | Logan | H04L 65/4015 715/201 |
| 2009/0254608 | A1* | 10/2009 | Butt | G06Q 10/109 709/203 |

(Continued)

*Primary Examiner* — Robert B Harrell
(74) *Attorney, Agent, or Firm* — Sughrue Mion, PLLC (57) ABSTRACT

A conference system and a method for interworking between an audio conference and a web conference in the system are provided. The method for interworking between an audio conference and a web conference according to one embodiment of the present disclosure includes recognizing, at an audio conference server, an access of a host terminal to an audio conference and activating the audio conference, transmitting, at the audio conference server, a notification of activation of the audio conference to a web conference server, and activating, at the web conference server, a web conference corresponding to the audio conference according to the notification of activation of the audio conference.

20 Claims, 5 Drawing Sheets

(56) References Cited

U.S. PATENT DOCUMENTS

| | | | |
|---|---|---|---|
| 2012/0163577 A1* | 6/2012 | Buford | H04L 12/1822 379/202.01 |
| 2012/0236110 A1* | 9/2012 | Ogle | H04L 12/1827 348/14.09 |
| 2013/0202095 A1* | 8/2013 | Jones | H04M 3/563 379/32.01 |
| 2014/0115077 A1* | 4/2014 | Cunningham | H04L 51/02 709/206 |
| 2014/0289646 A1* | 9/2014 | Munir | H04L 65/1093 715/753 |
| 2015/0030150 A1* | 1/2015 | Jones | H04M 3/563 379/204.01 |
| 2015/0296181 A1* | 10/2015 | Sanso | H04N 7/15 348/14.08 |
| 2015/0312418 A1* | 10/2015 | Terpstra | H04L 65/403 370/260 |

\* cited by examiner

CONFERENCE SYSTEM AND METHOD FOR INTERWORKING BETWEEN AUDIO CONFERENCE AND WEB CONFERENCE

CROSS-REFERENCE TO RELATED APPLICATION(S)

This application claims the benefit under 35 USC § 119(a) of Korean Patent Application No. 10-2017-0111791, filed on Sep. 1, 2017, in the Korean Intellectual Property Office, the entire disclosure of which is incorporated herein by reference for all purposes.

BACKGROUND

1. Field

The following description relates to a technology for linking an audio conference service and an additional service.

2. Description of Related Art

An audio conferencing system is a remote communication system in which two or more participants access a virtual conference room over a telephone line and conduct a voice conference in real time. With audio conferencing, people at multiple locations can conveniently collaborate over the phone.

Typical audio conferencing has only provided voice data transmission/reception among multiple users. However, recently, there is a growing demand for various additional services, such as document sharing, screen sharing, sharing of writing, and the like, in audio conferencing. In addition to the audio conferencing, there is a system which allows multiple participants to access a virtual conference room using a voice-over-Internet protocol (VoIP) technology without using a telephone and conduct a conference in an environment where sharing of voice, image, and document, screen sharing, and sharing of writing are available. Accordingly, there is an increasing attempt to set up an additional web conference associated with an existing audio conference and to provide additional services in the audio conference using the web conference.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for synchronizing the life cycle of a web conference with an audio conference when the audio conference is provided in association with the web conference.

In one general aspect, there is provided a method for interworking between conferences, the method including: recognizing, at an audio conference server, an access of a host terminal to an audio conference and activating the audio conference; transmitting, at the audio conference server, a notification of activation of the audio conference to a web conference server; and activating, at the web conference server, a web conference corresponding to the audio conference according to the notification of activation of the audio conference.

The method may further include transmitting, at the web conference server, a notification of activation of the web conference to the host terminal.

The method may further include: prior to the activating of the audio conference, recognizing, at the audio conference server, an access of a non-host terminal to the audio conference; and transmitting, at the audio conference server, a notification of access of the non-host terminal to the audio conference to the web conference server.

The transmitting of the notification of activation may further include transmitting the notification of activation of the web conference to the non-host terminal which has accessed the audio conference.

The method may further include: recognizing, at the audio conference server, termination of the access of the host terminal to the audio conference and deactivating the audio conference; transmitting, at the audio conference server, a notification of deactivation of the audio conference to the web conference server; and deactivating, at the web conference server, the web conference according to the notification of deactivation of the audio conference.

The method may further include transmitting, at the web conference server, the notification of deactivation of the web conference to one or more non-host terminals which have accessed the web conference.

In another general aspect, there is provided a method for interworking between conferences, which is performed in a web conference server comprising one or more processors and a memory in which one or more programs to be executed by the one or more processors are stored, the method including: receiving, from an audio conference server, a notification of activation of an audio conference according to an access of a host terminal to the audio conference; and activating an web conference corresponding to the audio conference according to the notification of activation of the audio conference.

The method may further include transmitting the notification of activation of the web conference to the host terminal.

When it is notified by the audio conference server that a non-host terminal has accessed the audio conference before the audio conference is activated, the transmitting of the notification of activation may further include transmitting the notification of activation of the web conference to the non-host terminal.

The method may further include: receiving, from the audio conference server, a notification of deactivation of the audio conference according to termination of the access of the host terminal to the audio conference; deactivating the web conference according to the notification of deactivation of the audio conference; and transmitting a notification of deactivation of the web conference to one or more non-host terminals which have accessed the web conference.

In still another general aspect, there is provided a conference system including: an audio conference server configured to recognize an access of a host terminal to an audio conference, activate the audio conference, and transmit a notification of activation of the audio conference; and a web conference server configured to activate a web conference corresponding to the audio conference according to the notification of activation of the audio conference which has been received from the audio conference server.

The web conference server may transmit a notification of activation of the web conference to the host terminal according to the activation of the web conference.

When a non-host terminal has accessed the audio conference before the host accesses the audio conference, the audio conference server may transmit a notification of access of the non-host server to the audio conference to the web conference server.

The web conference server may transmit the notification of activation of the web conference to the non-host terminal which has accessed the audio conference.

In response to termination of the access of the host terminal to the audio conference, the audio conference server may deactivate the audio conference and transmit a notification of deactivation of the audio conference to the web conference server and the web conference server may deactivate the web conference according to the notification of deactivation of the audio conference.

The web conference server may transmit a notification of deactivation of the web conference to one or more non-host terminals which have accessed the web conference.

In yet another general aspect, there is provided a web conference server device including: one or more processors; a memory; and one or more programs, wherein the one or more programs are stored in the memory and configured to be executed by one or more processors and the one or more programs include a command for receiving, from an audio conference server, a notification of activation of an audio conference according to an access of a host terminal to the audio conference and a command for activating a web conference corresponding to the audio conference according to the notification of activation of the audio conference.

The one or more programs may further include a command for transmitting a notification of activation of the web conference to the host terminal.

When a notification that a non-host terminal has accessed the audio conference is received before the command for activating the audio conference is performed, the command for transmitting the notification of activation may be configured to further include a command for transmitting a notification of activation of the web conference to the non-host terminal.

The one or more programs may further include: a command for receiving, from the audio conference server, a notification of deactivation of the audio conference according to termination of the access of the host terminal to the audio conference; a command for deactivating the web conference according to the notification of deactivation of the audio conference; and a command for transmitting a notification of deactivation of the web conference to one or more non-host terminals which have accessed the web conference.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
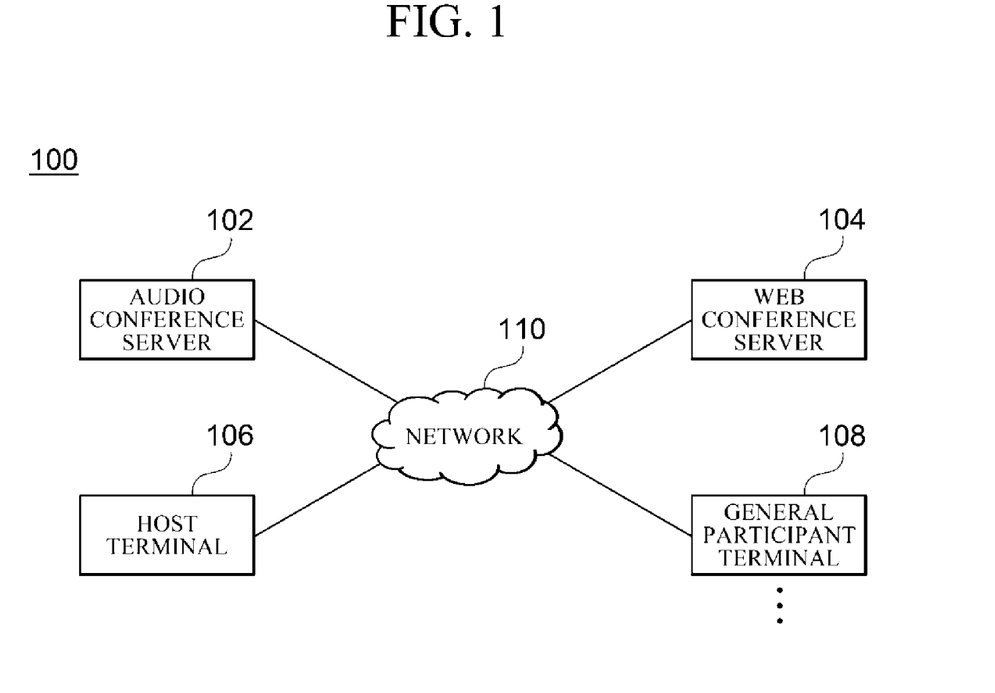
FIG. 1 is a block diagram for describing a conference system 100 according to one embodiment of the present disclosure.

FIG. 1 is a block diagram for describing a conference system 100 according to one embodiment of the present disclosure. As shown in FIG. 1, the conference system 100 according to one embedment of the present disclosure includes an audio conference server 102, a web conference server 104, a host terminal 106, and at least one general participant terminal 108.

The audio conference server 102 is a server for providing an audio conference service between the host terminal 106 and at least one general participant terminal 108.

In the event where the host terminal 106 participates in (accesses) an audio conference, the audio conference server 102 may recognize the access of the host terminal 106 and activates the audio conference. When the audio conference is activated, the audio conference server 102 transmits a notification of activation of the audio conference to the web conference server 104. In addition, when the audio conference access of the host terminal 106 is terminated, the audio conference server 102 deactivates the corresponding audio conference and transmits a notification of deactivation of the audio conference to the web conference server 104.

The web conference server 104 is a server for providing a web conference service between the host terminal 106 and at least one general participant terminal 180. In the disclosed embodiments, the web conference server 104 may provide services, such as screen sharing, sharing of writing, document sharing, and the like between the participants of the audio conference, in association with the audio conference server 102.

When the web conference server 104 receives the notification of activation of the audio conference from the audio conference server 102, the web conference server 104 activates a web conference corresponding to the audio conference and transmits a notification of activation of the web conference to the host terminal 106. Then, when the web conference server 104 receives a notification of deactivation of the web conference from the audio conference server 102, the web conference server 104 deactivates the web conference corresponding to the audio conference and transmits a notification of deactivation of the web conference to the participant terminals of the web conference.

The host terminal 106 is a terminal that accesses the audio conference server 102 and sets up an audio conference. In addition, the general participant terminal 108 (or referred to as a non-host terminal) is a concept distinguished from the host terminal 106 and is a terminal used by a general participant who participates in the audio conference set up by a host. Although only one general participant terminal 108 is shown in the embodiment illustrated in FIG. 1, it should be noted that, in embodiments of the present disclosure, the number of general participant terminals 108 may vary depending on the number of participants in the audio conference.

In the disclosed embodiments, the host terminal 106 and the general participant terminal 108 may include any types of communication devices, such as a desktop computer, a notebook computer, a tablet terminal, a smartphone, and the like, which can be provided with an audio conference service and a web conference service.

Meanwhile, the audio conference server 102, the web conference server 104, the host terminal 106, and the at least one general participant terminal 108 may transmit and receive data from and to each other through a communication network 110. In some embodiments, the communication network 110 may include the Internet, one or more local area networks (LANs), one or more wire area networks (WANs), one or more cellular networks, one or more mobile networks, and other types of networks, or a combination thereof.

In one embodiment, the audio conference server 102, the web conference server 104, the host terminal 106, and the at least one general participant terminal 108 may be implemented on a computing device including one or more processors and a computer-readable recording medium connected to the one or more processors. The computer-readable recording medium may be present inside or outside of the processors and may be connected to the processors by various well-known means. The processors present inside the computing device may allow each computing device to operate according to exemplary embodiments described herein. For example, the processors may execute an instruction stored in the computer-readable recording medium, and the instruction stored in the computer-readable recording medium may be configured to allow the computing device to execute operations according to the exemplary embodiments described herein when executed by the processors.

Hereinafter, a process of interworking between a web conference and an audio conference in a conference system 100 having the same configuration as described above will be described in detail.

Figure 2:
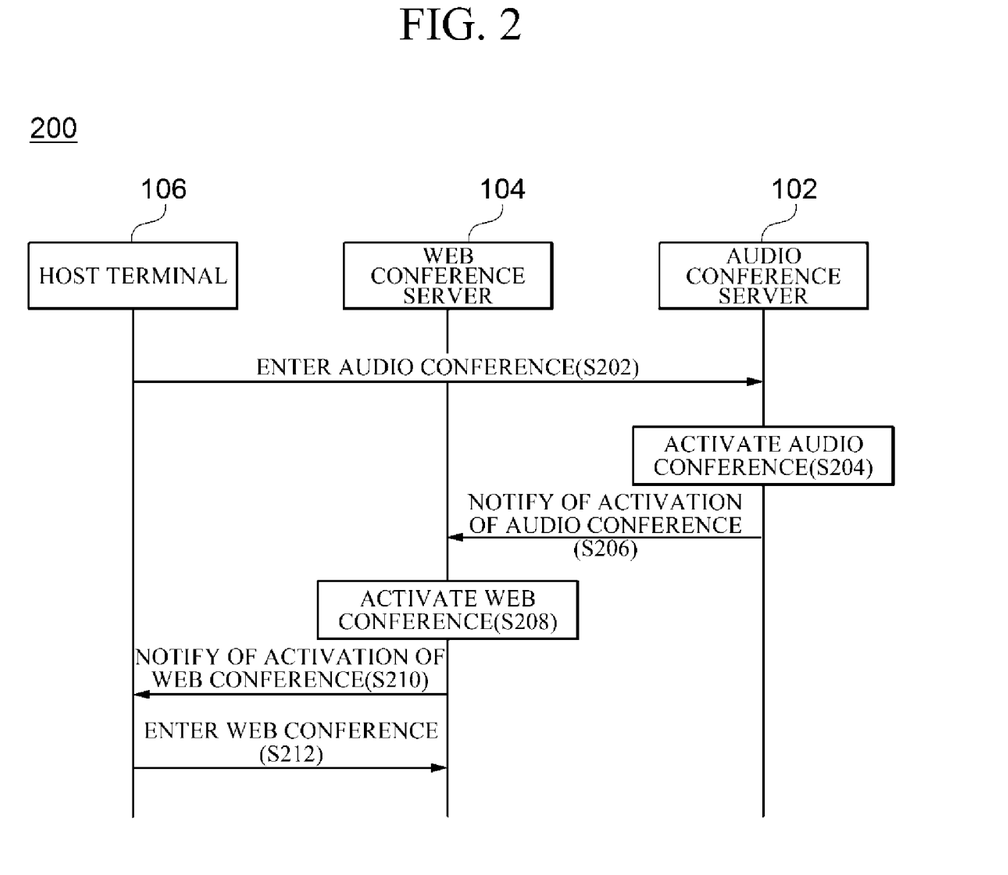
FIG. 2 is a flowchart for describing a process of interworking between a web conference and an audio conference when a host terminal accesses an audio conference server in a conference system in accordance with one embodiment of the present disclosure.

FIG. 2 is a flowchart for describing a process of interworking between a web conference and an audio conference when a host terminal 106 accesses an audio conference server 102 in a conference system 100 in accordance with one embodiment of the present disclosure. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 202, the host terminal 106 accesses the audio conference server 102 and accesses an audio conference set up in the audio conference server 102.

In operation 204, the audio conference server 102 recognizes the access of the host terminal 106 to the audio conference and activates the audio conference.

In operation 206, the audio conference server 102 transmits a notification of activation of the audio conference to the web conference server 104.

In operation 208, the web conference server 104 activates a web conference corresponding to the audio conference according to the received notification of activation of the audio conference.

In operation 210, the web conference server 104 transmits a notification of activation of the web conference to the host terminal 106. In this case, the notification of activation of the web conference may be transmitted to the host terminal 106 through an already-established access channel between the host terminal 106 and the web conference server 104 or through a short message service (SMS), a push message, or the like.

In operation 212, the host terminal 106 which has received the notification of activation of the web conference accesses the activated web conference.

Figure 3:
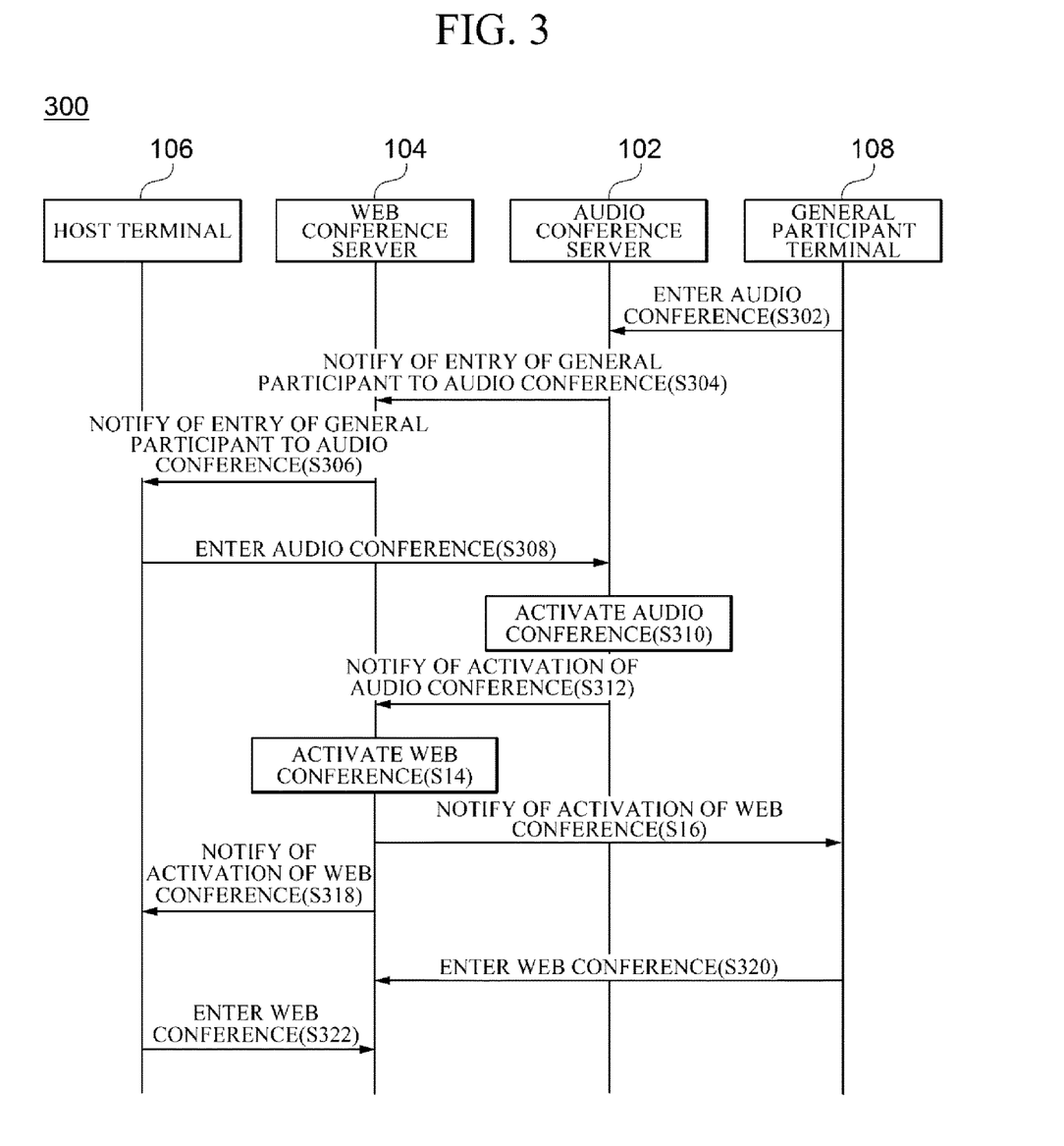
FIG. 3 is a flowchart for describing a process of interworking between a web conference and an audio conference when a general participant terminal accesses an audio conference server earlier than a host terminal in a conference system in accordance with one embodiment of the present disclosure.

FIG. 3 is a flowchart for describing a process of interworking between a web conference and an audio conference when a general participant terminal 108 accesses an audio conference server 102 earlier than a host terminal 106 in a conference system 100 in accordance with one embodiment of the present disclosure. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 302, the general participant terminal 108 accesses the audio conference server 102 earlier than the host terminal 106 and accesses an audio conference set up in the audio conference server 102 by the host terminal 106.

In operation 304, the audio conference server 102 transmits a notification that the general participant terminal 108 has accessed the audio conference to the web conference server 104. In this case, since the host terminal 106 has not been yet accessed the audio conference, the audio conference is not activated.

In operation 306, the web conference server 104 transmits the notification that the general participant terminal 108 has accessed the audio conference, which is received in operation 304, to the host terminal 106. In this case, the notification that the general participant terminal 108 has accessed the audio conference may be transmitted to the host terminal 106 through an already-established access channel between the host terminal 106 and the web conference server 104 or through an SMS, a push message, or the like.

In operation 308, the host terminal 106 accesses the audio conference server 102 and accesses the audio conference.

In operation 310, the audio conference server 102 recognizes the access of the host terminal 106 to the audio conference and activates the audio conference.

In operation 312, the audio conference server 102 transmits a notification of activation of the audio conference to the web conference server 104.

In operation 314, the web conference server 104 activates a web conference corresponding to the audio conference according to the received notification of activation of the audio conference.

In operation 316, the web conference server 104 transmits a notification of activation of the web conference to the general participant terminal 108. In this case, the notification of activation of the web conference may be transmitted to the general participant terminal 108 through an already-established access channel between the general participant terminal 108 and the web conference server 104 or through an SMS, a push message, or the like.

In operation 318, the web conference server 104 transmits a notification of activation of the web conference to the host terminal 106. In this case, the notification of activation of the web conference may be transmitted to the host terminal 106 through an already-established access channel between the host terminal 106 and the web conference server 104 or through an SMS, a push message, or the like.

In operation 320, the general participant terminal 108, which has received the notification of activation of the web conference, accesses the activated web conference.

In operation 322, the host terminal 106, which has received the notification of activation of the web conference, accesses the activated web conference.

Figure 4:
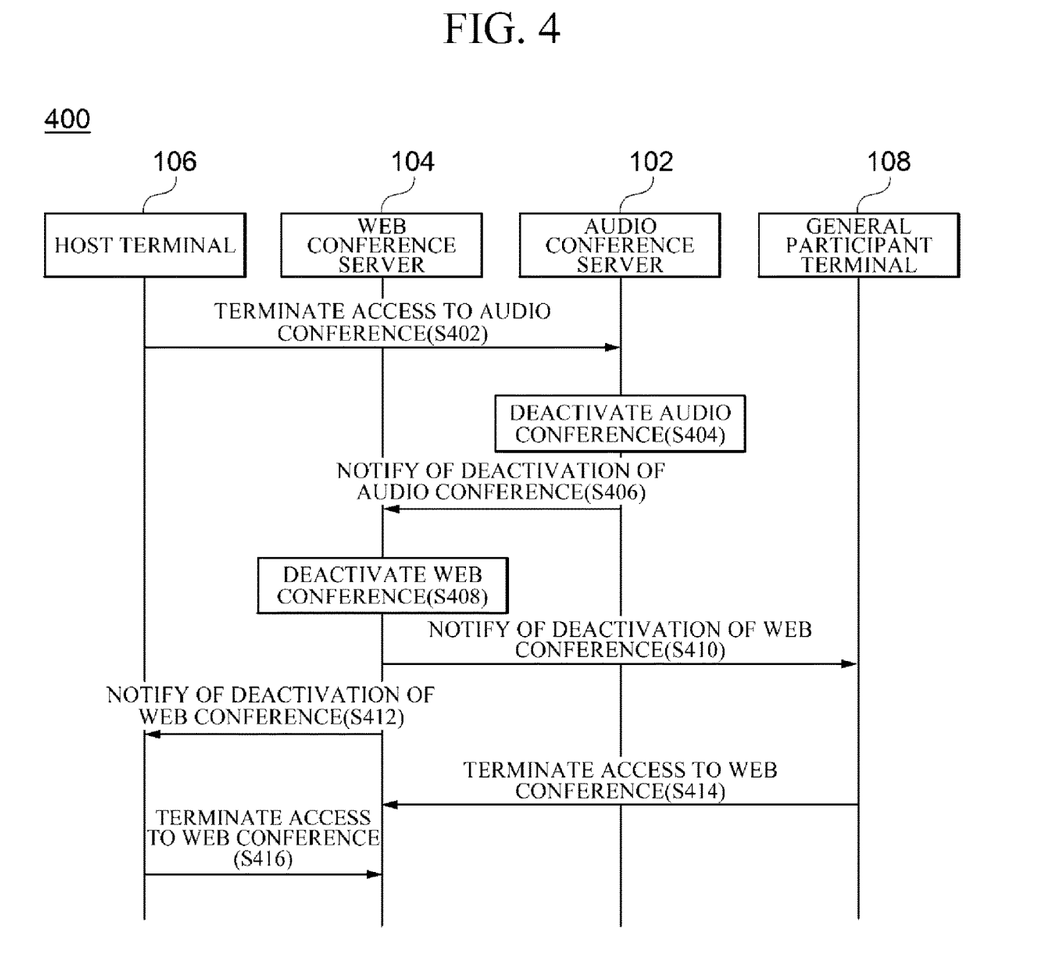
FIG. 4 is a flowchart for describing a process of interworking between a web conference and an audio conference when a host terminal terminates a connection with a conference server in a conference system in accordance with one embodiment of the present disclosure.

FIG. 4 is a flowchart for describing a process of interworking between a web conference and an audio conference when a host terminal 106 terminates an access to a conference server 102 in a conference system 100 in accordance with one embodiment of the present disclosure. In the illustrated flowchart, the process is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 402, the host terminal 106 terminates the access to a currently participating audio conference.

In operation 404, the audio conference server 102 recognizes that the host terminal 106 has terminated the access to an audio conference, and deactivates the audio conference.

In operation 406, the audio conference server 102 transmits the notification of deactivation of the audio conference to the web conference server 104.

In operation 408, the web conference server 104 deactivates a web conference according to the received notification of deactivation of the audio conference.

In operation 410, the web conference server 104 transmits a notification of deactivation of the web conference to the general participant terminal 108. In this case, the notification of deactivation of the web conference may be transmitted to the general participant terminal 108 through an already-established access channel between the general participant terminal 108 and the web conference server 104 or through an SMS, a push message, or the like.

In operation 412, the web conference server 104 transmits a notification of deactivation of the web conference to the host terminal 106. In this case, the notification of deactivation of the web conference may be transmitted to the host terminal 106 through an already-established access channel between the host terminal 106 and the web conference server 104 or through an SMS, a push message, or the like.

In operation 414, the general participant terminal 108, which has received the notification of deactivation of the web conference, terminates the access to the web conference.

In operation 416, the host terminal 106, which has received the notification of deactivation of the web conference, terminates the access to the web conference.

Figure 5:
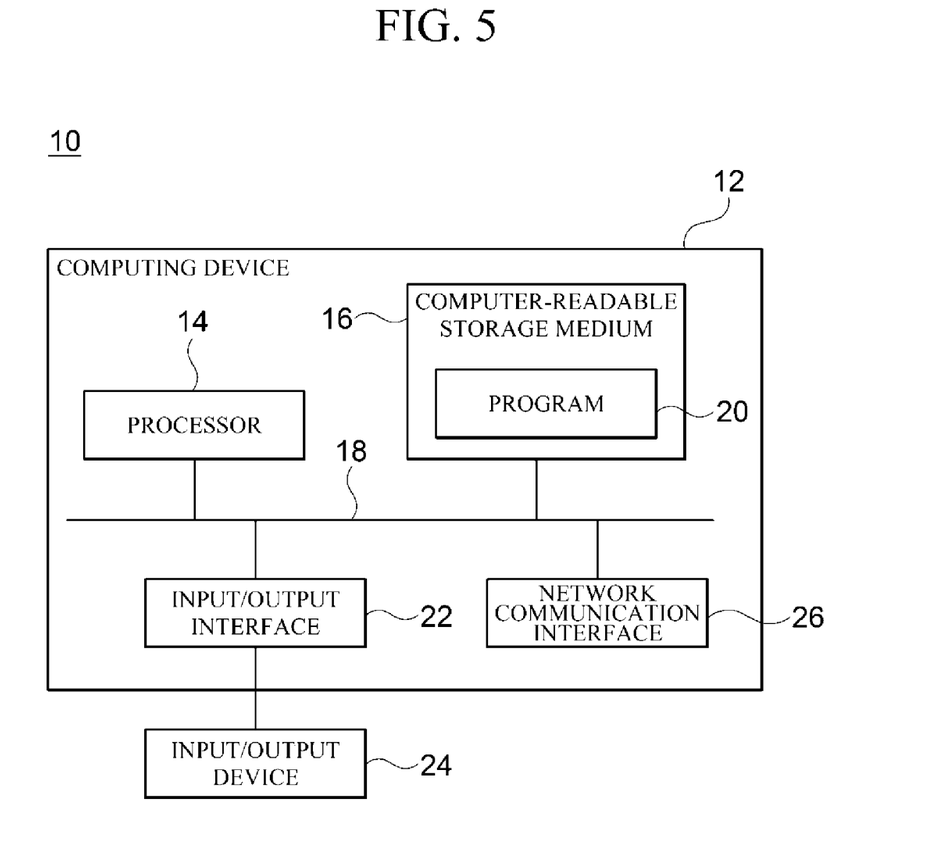
FIG. 5 is a block diagram illustrating a computing environment 10 including a computing device suitable to be used in illustrative embodiments of the present disclosure.

FIG. 5 is a block diagram illustrating a computing environment 10 including a computing device suitable to be used in illustrative embodiments of the present disclosure. In the illustrate embodiment, each of the components may have functions and capabilities different from those described hereinafter and additional components may be included in addition to the components described herein.

The illustrated computing environment 10 includes a computing device 12. In one embodiment, the computing device 12 may be an audio conference server 102. In addition, the computing device 12 may be a web conference server 104, a host terminal 106 or at least one general participant terminal 108. The computing device 12 may include at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, when an audio conference is activated due to participation of a host, a web conference corresponding to the audio conference is also activated, and when the audio conference is deactivated as the host terminates participation, the corresponding web conference is also deactivated. Therefore, according to the embodiments of the present disclosure, it is possible to synchronize the life cycle of the audio conference and the web conference without having to perform an operation for activating or deactivating the web conference individually on the host side, thereby improving the convenience of conference participants.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method comprising:
based on recognizing, by an audio conference server, an event where a host terminal accesses an audio conference, activating, by the audio conference server, the audio conference;
based on the audio conference being activated, transmitting, by the audio conference server, an automatically generated notification generated solely by the audio conference server, the automatically generated notification including information indicating the activation of the audio conference to a web conference server; and
based on receiving the notification of the activation of the audio conference, activating, by the web conference server, a web conference corresponding to the audio conference according to the notification of the activation of the audio conference.

2. The method of claim 1, further comprising transmitting, by the web conference server, a notification of the activation of the web conference to the host terminal.

3. The method of claim 2, further comprising: prior to the activating of the audio conference,
recognizing, by the audio conference server, an access of a non-host terminal to the audio conference; and
transmitting, by the audio conference server, a notification of the access of the non-host terminal to the audio conference to the web conference server.

4. The method of claim 3, further comprising transmitting the notification of the activation of the web conference to the non-host terminal which has accessed the audio conference.

5. The method of claim 1, further comprising:
recognizing, by the audio conference server, a termination of the access of the host terminal to the audio conference and deactivating the audio conference;
transmitting, by the audio conference server, a notification of the deactivation of the audio conference to the web conference server; and
deactivating, by the web conference server, the web conference according to the notification of the deactivation of the audio conference.

6. The method of claim 5, further comprising transmitting, by the web conference server, the notification of the deactivation of the web conference to one or more non-host terminals which have accessed the web conference.

7. A method for interworking between conferences, which is performed in a web conference server including one or more processors, the method comprising:
receiving, from an audio conference server, an automatically generated notification of an activation of an audio conference according to an access of a host terminal to the audio conference, the automatically generated notification being generated solely by the audio conference server, wherein the automatically generated notification includes information indicating the activation of the audio conference to the web conference server; and
based on receiving the notification of the activation of the audio conference, activating a web conference corresponding to the audio conference according to the notification of the activation of the audio conference.

8. The method of claim 7, further comprising transmitting, by the web conference server, the notification of the activation of the web conference to the host terminal.

9. The method of claim 8, further comprising, based on receiving a notification from the audio conference server that a non-host terminal has accessed the audio conference before the audio conference has been activated, transmitting, by the web conference server, the notification of the activation of the web conference to the non-host terminal with the transmitting of the notification of the activation to the audio conference.

10. The method of claim 7, further comprising:
receiving, from the audio conference server, a notification of a deactivation of the audio conference according to a termination of the access of the host terminal to the audio conference;
deactivating the web conference according to the notification of the deactivation of the audio conference; and
transmitting a notification of the deactivation of the web conference to one or more non-host terminals which have accessed the web conference.

11. A conference system comprising:
an audio conference server configured to:
based on recognizing an event where a host terminal accesses an audio conference, activate the audio conference;
based on the audio conference being activated, transmit, to a web conference server, an automatically generated notification generated solely by the audio conference server, the automatically generated notification including information indicating the activation of the audio conference to the web conference server; and a web conference server configured to, based on receiving the notification of the activation of the audio conference, activate a web conference corresponding to the audio conference according to the notification of activation of the audio conference.

12. The conference system of claim 11, wherein the web conference server is further configured to transmit a notification of the activation of the web conference to the host terminal according to the activation of the web conference.

13. The conference system of claim 12, wherein the audio conference server is further configured to, based on a non-host terminal having accessed the audio conference before the host accesses the audio conference, transmit, to the web conference server, a notification of the access of the non-host server to the audio conference.

14. The conference system of claim 13, wherein the web conference server is further configured to transmit the notification of the activation of the web conference to the non-host terminal which has accessed the audio conference.

15. The conference system of claim 11, wherein
the audio conference server is further configured to, based on a termination of the access of the host terminal to the audio conference, deactivate the audio conference and transmit a notification of a deactivation of the audio conference to the web conference server; and
the web conference server is further configured to deactivate the web conference according to the notification of the deactivation of the audio conference.

16. The conference system of claim 15, wherein the web conference server is further configured to transmit a notification of the deactivation of the web conference to one or more non-host terminals which have accessed the web conference.

17. A web conference server comprising:
one or more processors;
a memory; and
one or more programs, wherein the one or more programs are stored in the memory and are configured to be executed by the one or more processors, which causes the one or more processors to:
receive, from an audio conference server, an automatically generated notification of an activation of an audio conference according to an access of a host terminal to the audio conference, the automatically generated notification being generated solely by the audio conference server, wherein the automatically generated notification includes information indicating the activation of the audio conference to the web conference server; and
activate a web conference corresponding to the audio conference according to the notification of the activation of the audio conference.

18. The web conference server of claim 17, wherein the one or more programs are further configured to cause the one or more processors to: transmit a notification of the activation of the web conference to the host terminal.

19. The web conference server of claim 18, wherein the one or more programs are further configured to cause the one or more processors to, based on a notification that a non-host terminal has accessed the audio conference being received before the activating of the audio conference has been performed, transmit the notification of the activation of the web conference to the non-host terminal.

20. The web conference server device of claim 17, wherein the one or more programs are further configured to cause the one or more processors to:
receive, from the audio conference server, a notification of a deactivation of the audio conference according to a termination of the access of the host terminal to the audio conference;
deactivate the web conference according to the notification of the deactivation of the audio conference; and
transmit a notification of the deactivation of the web conference to one or more non-host terminals which have accessed the web conference.

\* \* \* \* \*